United States Patent
Morrison et al.

(10) Patent No.: US 6,591,292 B1
(45) Date of Patent: Jul. 8, 2003

(54) METHOD AND INTERFACE FOR INCORPORATING PROGRAM INFORMATION INTO AN ELECTRONIC MESSAGE

(75) Inventors: Hugh Boyd Morrison, Marion, IN (US); Mark Sheridan Westlake, Hamilton, IN (US); Robert Joseph Logan, Marion, IN (US)

(73) Assignee: Thomson Licensing S.A., Boulogne (FR)

(*) Notice: Subject to any disclaimer, the term of this patent is extended or adjusted under 35 U.S.C. 154(b) by 0 days.

(21) Appl. No.: 09/226,938

(22) Filed: Jan. 8, 1999

(51) Int. Cl.[7] .................. G06F 15/16; H04N 7/16; H04N 5/445
(52) U.S. Cl. ............. 709/206; 709/207; 709/246; 725/22; 348/563
(58) Field of Search ................ 348/460, 461, 348/468, 569, 570, 563, 564; 709/206, 207, 246; 707/513, 530, 503, 506, 507, 529, 531; 358/1.18

(56) References Cited

U.S. PATENT DOCUMENTS

| | | | |
|---|---|---|---|
| 5,283,887 A | * | 2/1994 | Zachery |
| 5,353,121 A | * | 10/1994 | Young et al. ............. 348/563 |
| 5,479,266 A | * | 12/1995 | Young et al. ............. 386/83 |
| 5,479,268 A | * | 12/1995 | Young et al. ............. 386/83 |
| 5,515,106 A | * | 5/1996 | Chaney et al. ............. 348/461 |
| 5,781,901 A | * | 7/1998 | Kuzma ............. 707/10 |
| 5,948,058 A | * | 9/1999 | Kudoh et al. ............. 709/206 |
| 6,141,681 A | * | 10/2000 | Kyle ............. 709/206 |
| 6,141,693 A | * | 10/2000 | Perlman et al. ............. 709/236 |
| 6,272,530 B1 | * | 8/2001 | Horiuchi et al. ............. 709/206 |

FOREIGN PATENT DOCUMENTS

| | | |
|---|---|---|
| WO | WO 97/45785 | 12/1997 |
| WO | WO 98 26584 A | 6/1998 |
| WO | WO 99 14947 | 3/1999 |
| WO | WO 99 35847 | 7/1999 |

* cited by examiner

*Primary Examiner*—Krisna Lim
(74) *Attorney, Agent, or Firm*—Joseph S. Tripoli; Paul P. Kiel

(57) ABSTRACT

An interface and a method for incorporating program information into an electronic message are provided. According to the method, a menu of programs is generated by displaying program identifiers on a display device. At least one of the program identifiers representing a program of interest is selected. An electronic message display is generated with program text indicative of that program incorporated into a message portion of the electronic message display. The message portion is sent by electronic message to a recipient, with the program text in the message portion. Preferably, selection of the program text by a recipient of the electronic message causes the respective program to be implemented or causes certain choices on how to implement the program to be presented to the recipient.

34 Claims, 7 Drawing Sheets

METHOD AND INTERFACE FOR INCORPORATING PROGRAM INFORMATION INTO AN ELECTRONIC MESSAGE

FIELD OF INVENTION

This invention generally relates to a method and interface for incorporating program information into an electronic message, and for receiving such program information by an electronic message and/or implementing, based on the received program information, a corresponding program.

BACKGROUND OF INVENTION

Electronic devices such as televisions and personal computers (PC) require a control system that includes a user interface system. Typically, a user interface provides information to a user and simplifies use of the device. One example of a user interface is an Electronic Program Guide (EPG) in a television system.

An EPG is an interactive, on-screen display feature that displays information analogous to TV listings found in local newspapers or other print media. In addition, an EPG also includes information necessary for collating and decoding programs. An EPG provides information about each program within the time frames covered by the EPG, which typically ranges from the next hour up to seven days. The information contained in an EPG includes programming characteristics such as channel number, program title, start time, end time, elapsed time, time remaining, rating (if available), topic, theme, and a brief description of the program's content. EPGs are usually arranged in a two-dimensional table or grid format with time information on one axis and channel information on the other axis.

Unlike non-interactive guides that reside on a dedicated channel and merely scroll through the current programming on the other channels, usually showing only the programs which begin within the next 2 to 3 hours, EPGs allow viewers to select any channel at any time during some period into the future, e.g., up to seven days forward. Further EPG features include the ability to highlight individual cells of the grid containing program information. Once highlighted, the viewer can perform functions pertaining to that selected program. For instance, the viewer could instantly switch to that program if it is currently being aired. Viewers could also program one touch video cassette recording (VCR) or the like if the television is properly configured and connected to a recording device. Such EPGs are known in the art and described, for instance, in U.S. Pat. Nos. 5,353,121; 5,479,268; and 5,479,266 issued to Young et al. and assigned to StarSight Telecast, Inc.

In addition, U.S. Pat. No. 5,515,106, issued to Chaney etc., and assigned to the same assignee of the present invention, describes in detail an exemplary embodiment including data packet structure necessary to implement an exemplary program guide system. The exemplary data packet structure is designed so that both the channel information (e.g., channel name, call letters, channel number, type, etc.) and the program information (e.g., title, rating, star, etc.) relating to a program may be transmitted from a program guide database distributor to a subscriber's receiving apparatus in an efficient manner.

User interfaces such as EPGs are applicable to analog and digital television systems and to other electronic devices such as personal computers. As electronic devices become increasingly complex with a multitude of features, the need for a robust and easy-to-use user interface becomes ever more important. For example, separate electronic systems having respective interfaces for controlling features of each system are now being combined into a single system requiring a single user interface. One specific example is the so-called PCTV which includes features of both a personal computer and a television. The user interface system for such a device must provide both clear communication of computer and television related information and provide for simple control of both computer and television related features.

Typically, however, the computer-related programs and operations are implemented independently of the television programs and operations. For example, when the user elects to compose, read and/or send an electronic message such as e-mail or electronic file, this is performed independently of any tuning, recording, and/or replaying of audio, video, or television programs. Likewise, the audio, video, or television programming, tuning, recording and/or replaying is performed independently of any information contained in electronic message. While programming information can be manually typed into an electronic message, this requires the sender to manually insert into the electronic message enough tuning information to enable the recipient to receive the subject program. The recipient then must actually read such program information and tune his television, audiovisual recording device, audio receiver and/or recorder, or the like to the relevant program for implementation of the program. The term "implementation" includes, for example, displaying, audibly broadcasting, replaying, recording, and the like.

If the recipient mistakenly transcribes or forgets the information from the electronic message, the wrong program may be implemented. Likewise, if the sender of the electronic message mistakenly reads a part of the programming information when typing this information into the electronic message (e.g., wrong time, wrong channel number, etc.) or if the sender makes a typographical error, then the recipient may implement the wrong program or may attempt to implement the program at the wrong time. This can be especially problematic if the recipient attempts to implement the program after it has aired. The sender also might inadvertently leave out an important part of the programming information, such as the time of broadcast, the channel, etc.

The potential for mistakes and miscommunication in sending and receiving programming information, however, is not the only problem associated with such conventional techniques. Another problem lies in the lack of convenience. It is inconvenient for the sender to manually type the programming information into the electronic message. It also is inconvenient for the recipient to read the entire compilation of program information and then manually implement the subject program. Notably, reading of such information may break the recipient's concentration on the subject matter of the writing. In this regard, when the programming information is not concise, it tends to distract the reader.

There is consequently a need in the art for a convenient way of incorporating into an electronic message, programming information from an interactive interface of an audio, video or audiovisual device, without having to manually type all of the requisite programming information into the electronic message. There also is a need for a convenient way of implementing a program which is referenced in an electronic message without having to read or manually transcribe all of the program information needed to implement the program.

SUMMARY OF THE INVENTION

The present invention overcomes at least one of the aforementioned problems and/or needs by providing a convenient way of incorporating into an electronic message, programming information from an interactive interface of an audio, video or audiovisual device, without having to manually type all of the requisite programming information into the electronic message.

The present inventions also provides a convenient way of electronically linking program information with the contents of an electronic message, when the electronic message is composed or sent, when the electronic message is received, or both when the electronic message is sent and received.

Furthermore, the present invention provides a convenient way of implementing a program which is referenced in an electronic message without having to read or manually transcribe or memorize all of the program information needed to implement the program.

Therefore, a method is described, comprising the steps of generating a menu of programs by displaying program identifiers on a display device, selecting at least one of the program identifiers which is associated with a program of interest, generating an electronic message display with program text indicative of the program of interest incorporated into a message portion of the electronic message display, and sending the message portion by electronic message to a recipient, with the program text incorporated into the message portion.

The present invention also provides an interface for incorporating program information into an electronic message. The interface comprises an electronically generated menu of programs, a program selector, an electronic message display, and an electronic device adapted to send a message portion of an electronic message. The electronically generated menu includes program identifiers indicative of the various programs. The program selector is adapted to select from the menu at least one of the program identifiers which is indicative of a program of interest. The electronic message display is electronically generated and is based at least in part on selection of the program identifier(s). The electronic message display includes program text indicative of the program of interest. The program text is included in the message portion of the electronic message display. The electronic device is adapted to send the message portion by electronic message to a recipient, with the program text incorporated into the message portion.

The present invention also provides a system for communicating program information via electronic message. The system comprises an electronic message receiver and an interface. The electronic message receiver is adapted to receive and display incoming electronic message. The interface is capable of incorporating program information into an electronic message and transmitting the program information electronically to the electronic message receiver. The interface comprises an electronically generated menu of programs, a program selector, an electronic message display, and an electronic device. The electronically generated menu includes program identifiers indicative of the various programs. The program selector is adapted to select from the menu at least one of the program identifiers which is indicative of a program of interest. An electronic message display is electronically generated and is based at least in part on selection of the program identifier(s). The electronic message display includes program text indicative of the program of interest. The program text is included in a message portion of the electronic message display. The electronic device is adapted to send the message portion by electronic message to a recipient at the electronic message receiver, with the program text incorporated into the message portion.

The present invention also provides an electronic message receiver for receiving program information via electronic message. The electronic message receiver is adapted to receive and display message text and program text, via electronic message, and also is adapted to process program information which is transmitted along with the message text and program text. The electronic message receiver comprises a selector adapted to select the program text in response to user actuation, to effect, based on the program information, implementation of a program represented by the program text.

The above and other objects and advantages will become more readily apparent when reference is made to the following description taken in conjunction with the accompanying drawings.

DETAILED DESCRIPTION

The term "program text", as used in this disclosure, encompasses not only letters, words and phrases, but also symbols, icons, and the like.

Figure 1:
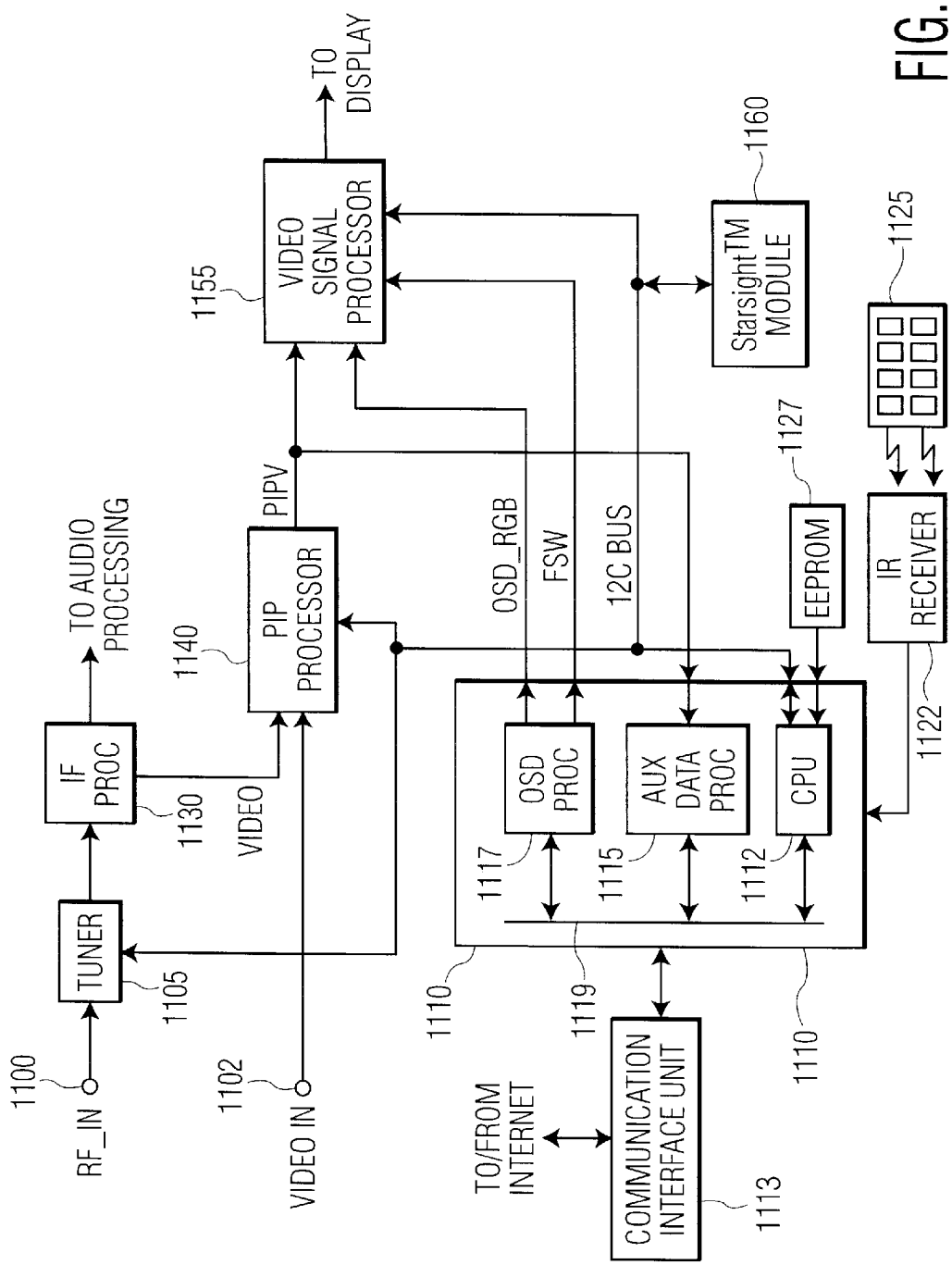
FIG. 1 shows an example of a television system suitable for processing electronic messages, generating an electronic program guide, and incorporating program information into an electronic message, in accordance with the present invention.

FIG. 1 shows an example of a television system suitable for processing program guide information and electronic messages, as well as for electronically linking electronic messages to programming information and programming information to electronic messages, in accordance with the present invention. The television receiver shown in FIG. 1 is capable of processing both analog NTSC television signals and Internet information. The system shown in FIG. 1 has a first input 1100 for receiving television signal RF_IN at RF frequencies and a second input 1102 for receiving baseband television signal VIDEO IN. Signal RF_IN may be supplied from a source such as an antenna or cable system while signal VIDEO IN may be supplied, for example, by a video cassette recorder (VCR). Tuner 1105 and IF processor 1130 operate in a conventional manner for tuning and demodulating a particular television signal that is included in signal RF_IN. IF processor 1130 produces baseband video signal VIDEO representing the video program portion of the tuned television signal. IF processor 1130 also produces a baseband audio signal that is coupled to an audio processing section (not shown in FIG. 1) for further audio processing. Although FIG. 1 shows input 1102 as a baseband signal, the television receiver could include a second tuner and IF processor similar to units 1105 and 1130 for producing a second baseband video signal from either signal RF_IN or from a second RF signal source.

The system shown in FIG. 1 also includes a main microprocessor (mP) 1110 for controlling components of the television receiver such as tuner 1105, picture-in-picture processing unit 1140, video signal processor 1155, and StarSight® data processing module 1160. As used herein, the term "microprocessor" represents various devices including, but not limited to, microprocessors, microcomputers, microcontrollers and controllers. Microprocessor 1110 controls the system by sending and receiving both commands and data via serial data bus I²C BUS which utilizes the well-known I²C serial data bus protocol. More specifically, central processing unit (CPU) 1112 within mP 1110 executes control programs contained within memory, such as EEPROM 1127 shown in FIG. 1, in response to commands provided by a user, e.g., via IR remote control 1125 and IR receiver 1122. For example, activation of a "CHANNEL UP" feature on remote control 1125 causes CPU 1112 to send a "change channel" command along with channel data to tuner 1105 via I²C BUS. As a result, tuner 1105 tunes the next channel in the channel scan list. Other examples of control programs stored in EEPROM 1127 are software for implementing the operations shown in FIG. 3 in accordance with the present invention as to be described below.

Main microprocessor 1110 also controls the operation of a communications interface unit 1113 for providing the capability to upload and download information to and from the Internet. Communication interface unit 1113 includes, for example, a modem for connecting to an Internet service provider, e.g., via a telephone line or via a cable television line. The communication capability allows the system shown in FIG. 1 to provide electronic message capability and Internet related features such as web browsing in addition to receiving television programming.

CPU 1112 controls functions included within mP 1110 via bus 1119 within mP 1110. In particular, CPU 1112 controls auxiliary data processor 1115 and on-screen display (OSD) processor 1117. Auxiliary data processor 1115 extracts auxiliary data such as StarSight® data from video signal PIPV.

StarSight® data which provides program guide data information in a known format is typically received only on a particular television channel and the television receiver must tune that channel to extract StarSight® data. To prevent StarSight® data extraction from interfering with normal use of the television receiver, CPU 1112 initiates StarSight® data extraction by tuning the particular channel only during a time period when the television receiver is usually not in use (e.g., 2:00 AM). At that time, CPU 1112 configures decoder 1115 such that auxiliary data is extracted from horizontal line intervals such as line 16 that are used for StarSight® data. CPU 1112 controls the transfer of extracted StarSight® data from decoder 1115 via I²C BUS to StarSight® module 1160. A processor internal to the module formats and stores the data in memory within the module. In response to the StarSight® EPG display being activated (e.g., a user activating a particular key on remote control 1125), CPU 1112 transfers formatted StarSight® EPG display data from StarSight® module 1160 via I²C BUS to OSD processor 1117.

OSD processor 1117 operates in a conventional manner to produce R, G, and B video signals OSD_RGB that, when coupled to a display device, will produce a displayed image representing onscreen display information such as graphics and/or text comprising an EPG. OSD processor 1117 also produces control signal FSW which is intended to control a fast switch for inserting signals OSD_RGB into the system's video output signal at times when an on-screen display is to be displayed. For example, when a user enables an EPG, e.g., by activating a particular switch on remote control 1125, CPU 1112 enables processor 1117. In response, processor 1117 produces signals OSD_RGB representing the program guide data information previously extracted and already stored in memory, as discussed above. Processor 1117 also produces signal FSW indicating when the EPG is to be displayed.

Video signal processor (VSP) 1155 performs conventional video signal processing functions, such as luma and chroma processing. Output signals produced by VSP 1155 are suitable for coupling to a display device, e.g., a kinescope or LCD device (not shown in FIG. 1), for producing a displayed image. VSP 1155 also includes a fast switch for coupling signals produced by OSD processor 1117 to the output video signal path at times when graphics and/or text is to be included in the displayed image. The fast switch is controlled by control signal FSW which is generated by OSD processor 1117 in main microprocessor 1110 at times when text and/or graphics are to be displayed.

The input signal for VSP 1155 is signal PIPV that is output by picture-in-picture (PIP) processor 1140. When a user activates PIP mode, signal PIPV represents a large picture (large pix) into which a small picture (small pix) is inset. When PIP mode is inactive, signal PIPV represents just the large pix, i.e., no small pix signal is included in signal PIPV. PIP processor 1140 provides the described functionality in a conventional manner using features included in unit 1140 such as a video switch, analog-to-digital converter (ADC), RAM, and digital to analog converter (DAC).

For an EPG display, the display data included in the EPG display is produced by OSD processor 1117 and included in the output signal by VSP 1155 in response to fast switch signal FSW. When controller 1110 detects activation of the EPG display, e.g., when a user presses an appropriate key on remote control 1125, controller 1110 causes OSD processor 1117 to produce the EPG display using information such as program guide data from StarSight® module 1160. Controller 1110 causes VSP 1155 to combine the EPG display data from OSD processor 1117 and the video image signal in response to signal FSW to produce a display including EPG. The EPG can occupy all or only a portion of the display area.

When the EPG display is active, controller 1110 executes a control program stored in EEPROM 1127. The control program monitors the location of a position indicator, such as a cursor and/or highlighting, in the EPG display. A user controls the location of the position indicator using direction and selection keys of remote control 1125. Alternatively, the system could include a mouse device. Controller 1110 detects activation of a selection device, such as clicking a mouse button, and evaluates current cursor location information in conjunction with EPG data being displayed to determine the function desired, e.g., tuning a particular program. Controller 1110 subsequently activates the control action associated with the selected feature.

The processing and displaying of a program guide in accordance with the present invention may be implemented using combination of software and hardware. For example, referring to FIG. 1, display of an EPG may be implemented by software in memory such as EEPROM 1127. Activation of an EPG, e.g., by a user pressing an EPG related button on remote control 1125, causes CPU 1112 to execute the EPG software routine. As part of generating an EPG display, CPU 1112 also accesses EPG data and graphics that may be stored in StarSight module 1160 via the I2C bus. Under control of the EPG software routine stored in EEPROM 1127, CPU 1112 enables OSD processor 1117 which formats the EPG data into a form suitable for producing an OSD representing the EPG data and graphics. The OSD data produced by OSD processor 1117 is coupled to video signal processor (VSP) 1155 via signal lines OSD_RGB. A fast switch in VSP 1155 couples the EPG OSD data to the output of VSP 1155 under control of signal FSW. That is, the software routine being executed by CPU 1112 determines when the EPG data is to be displayed (e.g., what portion of the display) and sets signal FSW to the appropriate state for causing the fast switch to couple the EPG data to the output.

An exemplary embodiment of the features of the system shown in FIG. 1 that have been described thus far comprises an ST9296 microprocessor produced by SGS-Thomson Microelectronics for providing the features associated with mP 1110; an M65616 picture-in-picture processor produced by Mitsubishi for providing the described basic PIP functionality associated with PIP processor 1140; and an LA7612 video signal processor produced by Sanyo for providing the functions of VSP 1155.

Figure 2:
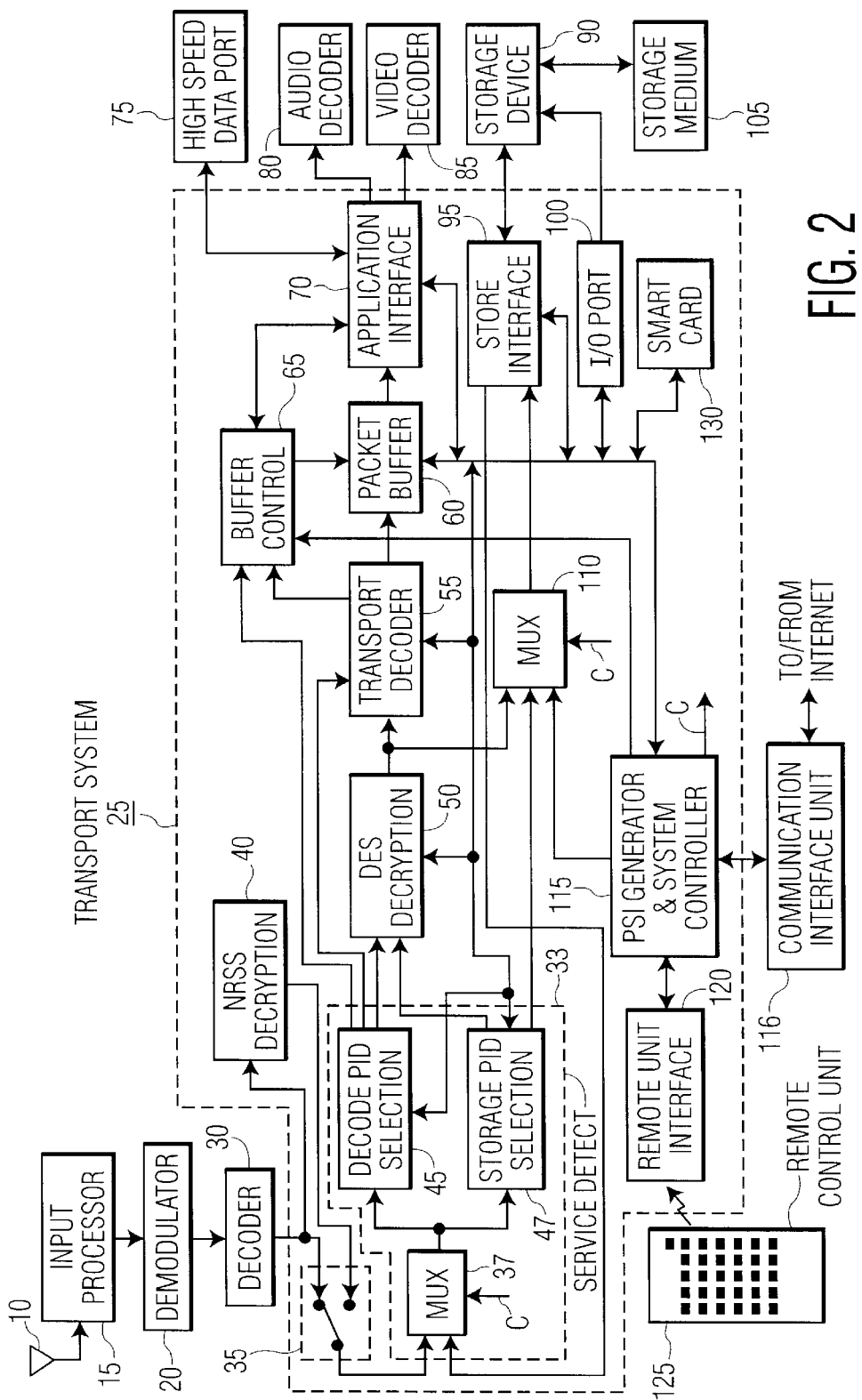
FIG. 2. shows an example of a digital video processing apparatus suitable for processing electronic messages, generating an electronic program guide, and incorporating program information into an electronic message, in accordance with the present invention.

FIG. 2 shows another example of an electronic system suitable for processing program guide information and electronic messages, as well as for electronically linking electronic messages to programming information and programming information to electronic messages, in accordance with the present invention. As described below, the system shown in FIG. 2 is an MPEG compatible system for receiving MPEG encoded transport streams representing broadcast programs and is also capable of processing Internet information, including electronic message. The system shown in FIG. 2 is exemplary only. User interface systems are also applicable to other types of digital signal processing devices including non-MPEG compatible systems, involving other types of encoded datastreams. For example, other devices include digital video disc (DVD) systems and MPEG program streams, and systems combining computer and television functions such as the so-called "PCTV". Further, although the system described below is described as processing broadcast programs, this is exemplary only. The term 'program' is used to represent any form of packetized data such as telephone messages, computer programs, Internet data, audio presentations (e.g., from a remote source or from a local source), visual presentations, audiovisual presentations (e.g., from a remote source or a local source), or other communications, for example.

In overview, in the video receiver system of FIG. 2, a carrier modulated with video data is received by antenna 10 and processed by input processor unit 15. The resultant digital output signal is demodulated by demodulator 20 and decoded by decoder 30. The output from decoder 30 is processed by transport system 25 which is responsive to commands from remote control unit 125. System 25 provides compressed data outputs for storage, further decoding, or communication to other devices.

Video and audio decoders 85 and 80 respectively, decode the compressed data from system 25 to provide outputs for display. Data port 75 provides an interface for communication of the compressed data from system 25 to other devices such as a computer or High Definition Television (HDTV) receiver, for example. Storage device 90 stores the compressed data from system 25 on storage medium 105. Device 90, in a playback mode also supports retrieval of the compressed data from storage medium 105 for processing by system 25 for decoding, communication to other devices or storage on a different storage medium (not shown to simplify drawing).

Considering FIG. 2 in detail, a carrier modulated with video data received by antenna 10, is converted to digital form and processed by input processor 15. Processor 15 includes radio frequency (RF) tuner and intermediate frequency (IF) mixer and amplification stages for down-converting the input video signal to a lower frequency band suitable for further processing. The resultant digital output signal is demodulated by demodulator 20 and decoded by decoder 30. The output from decoder 30 is further processed by transport system 25.

Multiplexer (mux) 37 of service detector 33 is provided, via selector 35, with either the output from decoder 30, or the decoder 30 output further processed by a descrambling unit 40. Descrambling unit 40 may be, for example, a removable unit such as a smart card in accordance with ISO 7816 and NRSS (National Renewable Security Standards) Committee standards (the NRSS removable conditional access system is defined in EIA Draft Document IS-679, Project PN-3639). Selector 35 detects the presence of an insertable, compatible, descrambling card and provides the output of unit 40 to mux 37 only if the card is currently inserted in the video receiver unit. Otherwise selector 35 provides the output from decoder 30 to mux 37. The presence of the insertable card permits unit 40 to descramble additional premium program channels, for example, and provide additional program services to a viewer. It should be noted that in the preferred embodiment NRSS unit 40 and smart card unit 130 (smart card unit 130 is discussed later) share the same system 25 interface such that only either an NRSS card or a smart card may be inserted at any one time. However, the interfaces may also be separate to allow parallel operation.

The data provided to mux 37 from selector 35 is in the form of an MPEG compliant packetized transport datastream as defined in MPEG systems standard section 2.4 and includes program guide information and the data content of one or more program channels. The individual packets that comprise particular program channels are identified by Packet Identifiers (PIDs). The transport stream contains Program Specific Information (PSI) for use in identifying the PIDs and assembling individual data packets to recover the content of all the program channels that comprise the packetized datastream. Transport system 25, under the control of the system controller 115, acquires and collates program guide information from the input transport stream, storage device 90 or an Internet service provider via the communication interface unit 116. The individual packets that comprise either particular program channel content or Program Guide information, are identified by their Packet Identifiers (PIDs) contained within header information. As discussed above, the program description may comprise different program descriptive fields such as title, star, rating, etc., relating to a program.

The user interface incorporated in the video receiver shown in FIG. 2 enables a user to activate various features by selecting a desired feature from an on-screen display (OSD) menu. The OSD menu may include an electronic program guide (EPG) as described above and other features discussed below. Data representing information displayed in the OSD menu is generated by system controller 115 in response to stored program guide information, stored graphics information, and/or program guide and graphics information received via the input signal (e.g., StarSight data) as described above. The software control program may be stored, for example, in embedded memory (not shown) of system controller 115.

Using remote control unit 125 (or other selection means such as a mouse) a user can select from the OSD menu items such as a program to be viewed, a program to be stored, the type of storage media and manner of storage. System controller 115 uses the selection information, provided via remote unit interface 120, to configure system 25 to select the programs for storage and display and to generate PSI suitable for the selected storage device and media. Controller 115 configures system 25 elements 45, 47, 50, 55, 65 and 95 by setting control register values within these elements via a data bus and by selecting signal paths via muxes 37 and 110 with control signal C.

In response to control signal C, mux 37 selects either, the transport stream from unit 35, or in a playback mode, a datastream retrieved from storage device 90 via store interface 95. In normal, non-playback operation, the data packets comprising the program that the user selected to view are identified by their PIDs by selection unit 45. If an encryption indicator in the header data of the selected program packets indicates the packets are encrypted, unit 45 provides the packets to decryption unit 50. Otherwise unit 45 provides non-encrypted packets to transport decoder 55. Similarly, the data packets comprising the programs that the user selected for storage are identified by their PIDs by selection unit 47. Unit 47 provides encrypted packets to decryption unit 50 or non-encrypted packets to mux 110 based on the packet header encryption indicator information.

The functions of decryptors 40 and 50 may be implemented in a single removable smart card which is compatible with the NRSS standard. This approach places all security related functions in one removable unit that easily can be replaced if a service provider decides to change encryption technique or to permit easily changing the security system, e.g., to descramble a different service.

Units 45 and 47 employ PID detection filters that match the PIDs of incoming packets provided by mux 37 with PID values pre-loaded in control registers within units 45 and 47 by controller 115. The pre-loaded PIDs are used in units 47 and 45 to identify the data packets that are to be stored and the data packets that are to be decoded for use in providing a video image. The pre-loaded PIDs are stored in look-up tables in units 45 and 47. The PID look-up tables are memory mapped to encryption key tables in units 45 and 47 that associate encryption keys with each pre-loaded PID. The memory mapped PID and encryption key look-up tables permit units 45 and 47 to match encrypted packets containing a pre-loaded PID with associated encryption keys that permit their decryption. Non-encrypted packets do not have associated encryption keys. Units 45 and 47 provide both identified packets and their associated encryption keys to decryptor 50. The PID look-up table in unit 45 is also memory mapped to a destination table that matches packets containing pre-loaded PIDs with corresponding destination buffer locations in packet buffer 60. The encryption keys and destination buffer location addresses associated with the programs selected by a user for viewing or storage are pre-loaded into units 45 and 47 along with the assigned PIDs by controller 115. The encryption keys are generated by ISO 7816-3 compliant smart card system 130 from encryption codes extracted from the input datastream. The generation of the encryption keys is subject to customer entitlement determined from coded information in the input datastream and/or pre-stored on the insertable smart card itself (International Standards Organization document ISO 7816-3 of 1989 defines the interface and signal structures for a smart card system).

The packets provided by units 45 and 47 to unit 50 are encrypted using an encryption techniques such as the Data Encryption Standard (DES) defined in Federal Information Standards (FIPS) Publications 46, 74 and 81 provided by the National Technical Information Service, Department of Commerce. Unit 50 decrypts the encrypted packets using corresponding encryption keys provided by units 45 and 47 by applying decryption techniques appropriate for the selected encryption algorithm. The decrypted packets from unit 50 and the non-encrypted packets from unit 45 that comprise the program for display are provided to decoder 55. The decrypted packets from unit 50 and the non-encrypted packets from unit 47 that comprise the program for storage are provided to mux 110.

Unit 60 contains four packet buffers accessible by controller 115. One of the buffers is assigned to hold data destined for use by controller 115 and the other three buffers are assigned to hold packets that are destined for use by application devices 75, 80 and 85. Access to the packets stored in the four buffers within unit 60 by both controller 115 and by application interface 70 is controlled by buffer control unit 65. Unit 45 provides a destination flag to unit 65 for each packet identified by unit 45 for decoding. The flags indicate the individual unit 60 destination locations for the identified packets and are stored by control unit 65 in an internal memory table. Control unit 65 determines a series of read and write pointers associated with packets stored in buffer 60 based on the First-In-First-Out (FIFO) principle. The write pointers in conjunction with the destination flags permit sequential storage of an identified packet from units 45 or 50 in the next empty location within the appropriate destination buffer in unit 60. The read pointers permit sequential reading of packets from the appropriate unit 60 destination buffers by controller 115 and application interface 70.

The non-encrypted and decrypted packets provided by units 45 and 50 to decoder 55 contain a transport header as defined by section 2.4.3.2 of the MPEG systems standard. Decoder 55 determines from the transport header whether the non-encrypted and decrypted packets contain an adaptation field (per the MPEG systems standard). The adaptation field contains timing information including, for example, Program Clock References (PCRs) that permit synchronization and decoding of content packets. Upon detection of a timing information packet, that is a packet containing an adaptation field, decoder 55 signals controller 115, via an interrupt mechanism by setting a system interrupt, that the packet has been received. In addition, decoder 55 changes the timing packet destination flag in unit 65 and provides the packet to unit 60. By changing the unit 65 destination flag, unit 65 diverts the timing information packet provided by decoder 55 to the unit 60 buffer location assigned to hold data for use by controller 115, instead of an application buffer location.

Upon receiving the system interrupt set by decoder 55, controller 115 reads the timing information and PCR value and stores it in internal memory. PCR values of successive timing information packets are used by controller 115 to adjust the system 25 master clock (27 MHz). The difference between PCR based and master clock based estimates of the time interval between the receipt of successive timing packets, generated by controller 115, is used to adjust the system 25 master clock. Controller 115 achieves this by applying the derived time estimate difference to adjust the input control voltage of a voltage controlled oscillator used to generate the master clock. Controller 115 resets the system interrupt after storing the timing information in internal memory.

Packets received by decoder 55 from units 45 and 50 that contain program content including audio, video, caption, and other information, are directed by unit 65 from decoder 55 to the designated application device buffers in packet buffer 60. Application control unit 70 sequentially retrieves the audio, video, caption and other data from the designated buffers in buffer 60 and provides the data to corresponding application devices 75, 80 and 85. The application devices comprise audio and video decoders 80 and 85 and high speed data port 75. For example, packet data corresponding to a composite program guide generated by the controller 115 as described above, may be transported to the video decoder 85 for formatting into video signal suitable for display on a monitor (not shown) connected to the video decoder 85. Also, for example, data port 75 may be used to provide high speed data such as computer programs, for example, to a computer. Alternatively, port 75 may be used to output data to an HDTV decoder to display images corresponding to a selected program or a program guide, for example.

Packets that contain PSI information are recognized by unit 45 as destined for the controller 115 buffer in unit 60. The PSI packets are directed to this buffer by unit 65 via units 45, 50 and 55 in a similar manner to that described for packets containing program content. Controller 115 reads the PSI from unit 60 and stores it in internal memory.

Controller 115 also generates condensed PSI (CPSI) from the stored PSI and incorporates the CPSI in a packetized datastream suitable for storage on a selectable storage medium. The packet identification and direction is governed by controller 115 in conjunction with the unit 45 and unit 47 PID, destination and encryption key look-up tables and control unit 65 functions in the manner previously described.

In addition, controller 115 is coupled to a communication interface unit 116 that operates in a manner similar to interface unit 1113 in FIG. 1. That is, unit 116 provides the capability to upload and download information to and from the Internet. Communication interface unit 116 includes, for example, a modem for connecting to an Internet service provider, e.g., via a telephone line or via a cable television line. The communication capability allows the system shown in FIG. 2 to provide electronic message capability and Internet related features such as web browsing in addition to receiving television programming.

Figure 3:
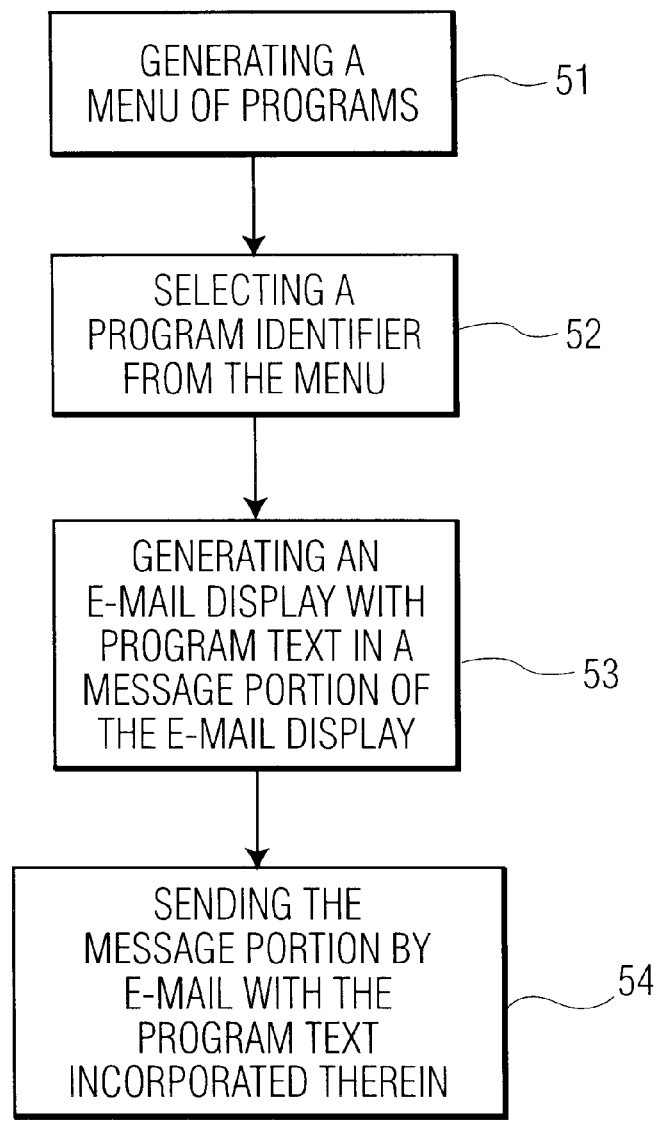
FIG. 3 is a flow chart of a method of incorporating program guide information into an electronic message in accordance with a preferred implementation of the present invention.

FIG. 3 is a flow chart of an exemplary program which, according to the present invention, may be executed by controller 1110 of FIG. 1, controller 115 of FIG. 2, or any other suitably programmed control arrangement of an electronic host device. The term "electronic host device" as used herein is not limited to television receivers or personal computers, but rather encompasses hybrids thereof (e.g., PCTVs), cable television converter boxes, suitably equipped audiovisual program recorders (e.g., video tape recorders), satellite television and/or data signal converters, program guide receiver units, and the like, regardless of whether incorporated into a television receiver or personal computer or connected externally thereto. It will be appreciated that the exemplary program may be implemented in hardware, software, or a combination thereof.

The exemplary program, when executed, facilitates processing of program guide information and electronic messages, as well as electronic linking of electronic messages to programming information and electronic linking of programming information to electronic messages, in accordance with the present invention. A person skilled in the art would readily recognize from the flow chart and the following description that the exemplary program when executed by any one of the systems illustrated in FIGS. 1 and 2 or by any other suitably programmed electronic host device will provide substantially the same features and advantages in accordance with the present invention. Therefore, to avoid redundancy, the exemplary program will be described below only with respect to the exemplary hardware implementation of an electronic host device shown in FIG. 1.

In FIG. 1, the microprocessor 1110 is connected to the EEPROM 1127. The exemplary program may be stored in the EEPROM 1127 for execution by the microprocessor 1110. One object of the exemplary program is to incorporate program information into an electronic message.

According to the exemplary program, the microprocessor 1110 initially executes the step S1 of generating a menu of programs by displaying program identifiers on a display device associated with the electronic host device. Each of the program identifiers designates one of a plurality of programs which can be implemented (e.g., displayed, audibly broadcast, or executed) by the electronic host device itself or which can be implemented by a display device, audio equipment or a computer associated with the electronic host device.

Preferably, the step S1 of generating the menu is accomplished in response to the StarSight® EPG display being activated (e.g., a user activating a particular key on remote control 1125). In response to such activation, the CPU 1112 transfers formatted StarSight® EPG display data from StarSight® module 1160 via I$^2$C BUS to OSD processor 1117.

OSD processor 1117 operates in a conventional manner to produce R, G, and B video signals OSD_RGB that, when coupled to a display device, will produce a displayed image representing on-screen display information such as graphics and/or text comprising an EPG. This on-screen display information includes, among other things, the aforementioned program identifiers. It also may include characteristic information pertaining to each of the programs represented by the program identifiers. Examples of the characteristic information include program title, program theme, program category, program keywords, program description, program type, program length, program starting time, program ending time, repeat frequency, or combinations thereof.

OSD processor 1117 also produces control signal FSW which is intended to control a fast switch for inserting signals OSD_RGB into the system's video output signal at times when an on-screen display is to be displayed. For example, when a user enables an EPG by activating a particular switch on remote control 1125 or otherwise, CPU 1112 enables processor 1117. In response, processor 1117 produces signals OSD_RGB representing the program guide information previously extracted and already stored in memory, as discussed above. Processor 1117 also produces signal FSW indicating when the EPG is to be displayed.

Video signal processor (VSP) 1155 performs conventional video signal processing functions, such as luma and chroma processing. Output signals produced by VSP 1155 are suitable for coupling to the display device, e.g., a kinescope or LCD device (not shown in FIG. 1), for producing a displayed image. VSP 1155 also includes a fast switch for coupling signals produced by OSD processor 1117 to the output video signal path at times when graphics and/or text is to be included in the displayed image. The fast switch is controlled by control signal FSW which is generated by OSD processor 1117 in controller 1110 at times when text and/or graphics are to be displayed.

The display data included in the EPG display is produced by OSD processor 1117 and included in the output signal by VSP 1155 in response to fast switch signal FSW. When controller 1110 detects activation of the EPG display, e.g., when a user presses an appropriate key on remote control 1125, controller 1110 causes OSD processor 1117 to produce the EPG menu display using program information provided by the StarSight® module 1160. Controller 1110 causes VSP 1155 to combine the EPG display menu from OSD processor 1117 and the video image signal in response to signal FSW to produce a display including the EPG menu. The EPG menu can occupy all or only a portion of the display area.

Figure 4:
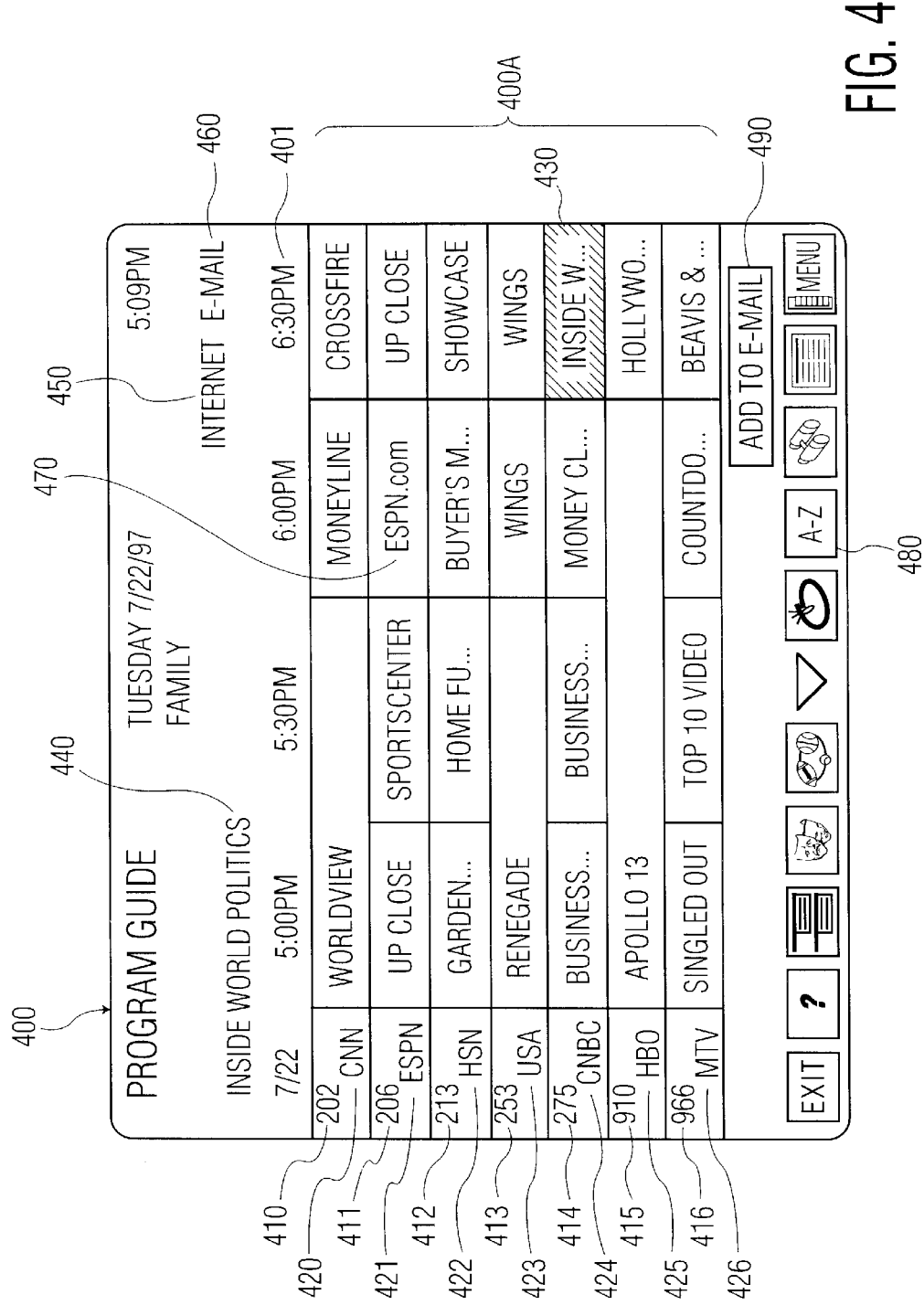
FIG. 4 shows an exemplary EPG menu according to a preferred embodiment of the present invention.

An exemplary EPG menu 400 is shown in FIG. 4. The menu 400 includes a "grid guide" 400A which shows a program schedule in a time-and-channel format, similar to a TV schedule listed in a newspaper. One dimension (e.g., the horizontal dimension) of the "grid guide" 400A shows the time information 401, while the other dimension (e.g., the vertical dimension) of the "grid guide" 400A shows channel information. When an abbreviated element 430 of the "grid guide" is highlighted or a cursor is located thereon, as will be described hereinafter, truncated parts of the abbreviated element 430 appear in a "highlighted text" field 440 of the menu 400.

In the menu 400, each of the program identifiers (e.g., channel numbers 410–416, channel station names 420–426, web-site identifier 470, Internet identifier 450, electronic message identifier 460, and the like) is selectable by a user to implement respective ones of the programs. In particular, the control program in EEPROM 1127 causes the controller 1110 to monitor the location of a position 25 indicator, such as a cursor and/or highlighting, on the EPG menu display. A user controls the location of the position indicator using direction and selection keys of remote control 1125. Alternatively, the system could include a mouse device or an appropriate pointer device.

Controller 1110 detects activation of a selection device, such as clicking of a mouse button, and evaluates current cursor/highlighting location information in conjunction with EPG menu data being displayed to determine the function desired (e.g., implementing a particular program). If such activation of the selection device is performed while the cursor and/or highlighting is located on one of the program identifiers, the controller 1110 determines that the corresponding program is to be implemented (i.e., displayed, audibly broadcast, and/or executed). Controller 1110 subsequently activates the control action associated with the selected program.

If, for example, the selected program identifier represents a web-site, the controller 1110 implements a web-browsing program and accesses the corresponding web-site. When the selected program identifier is associated with an audio program, video program, or audiovisual program, the controller 1110 responds by tuning the electronic host device or an associated receiver to the appropriate channel and by displaying and/or audibly broadcasting that program. Highlighting of such programs and subsequent selection of other function icons on the menu 400 can implement automatic tuning at a later time to the selected program or automatic recording thereof by the electronic host device or by another device connected to the electronic host device.

Selection of the "Internet" identifier 450 causes the controller 1110 to implement a web-browsing program through an Internet service provider, while selection of the "electronic message" identifier 460 causes the controller 1110 to implement an electronic message transmission and/or reception program through the same or a different Internet service provider. The step S1 in FIG. 3 and the menu 400 in FIG. 4 thus provide a generally effective, versatile, and convenient EPG arrangement.

The EPG arrangement, however, is made even more convenient and versatile by permitting the incorporation of the program information into an electronic message. According to step S2 in FIG. 3, one of the program identifiers is selected by the user (e.g., using the remote control 1125 to highlight or position a cursor on one of the program identifiers) when the program associated therewith is a program of interest.

In FIG. 4, the program identifier 430 for the television program "Inside World Politics" is highlighted (as indicated by the cross-hatching). Notably, the unabbreviated version of the program identifier 430 appears in the "highlighted text" field 440 of the menu 400. The program "Inside World Politics" therefore constitutes a program of interest to the user.

Once the program identifier has been selected, as indicated above, the user is able to implement an "ADD TO ELECTRONIC MESSAGE" function. In particular, one of the function icons along the bottom of the menu 400 is an "ADD to ELECTRONIC MESSAGE" icon 490. This icon 490 can be selected using a suitable cursor arrangement or otherwise to implement the "ADD TO ELECTRONIC MESSAGE" function. Alternatively, the remote control 1125 can include a dedicated "ADD TO ELECTRONIC MESSAGE" button which is actuatable by the user when a program is highlighted, or alternatively, when the program is being displayed, executed, or is otherwise being implemented. Actuation of that button communicates to the controller 1110 the user's intention to incorporate program information associated with the highlighted program (i.e., the program of interest) into an electronic message.

According to another alternative, a keyboard (not shown) may be connected through a suitable interface to the controller 1110. The keyboard may have appropriate alphanumeric keys for use in composing electronic message, as well as a key or sequence of keys which, when pressed, cause the keyboard to communicate to the controller 1110 the user's desire to perform an "ADD to ELECTRONIC MESSAGE" function.

In addition, or alternatively, selection of a program identifier (e.g., 430) causes the controller 1110 to display a plurality of choices to the user on whether to implement the relevant program, and if so, how. Included in the choices is the choice of sending the program guide information associated with the relevant program by electronic message to an electronic message recipient.

Regardless of how the user communicates to the controller 1110 this desire to send program information by electronic message (whether by icon selection, button pushing, keyboard entry, or the like), the controller 1110 responds, according to step S3 in FIG. 3, by generating an electronic message display with program text indicative of the program of interest incorporated into a message portion of the electronic message display.

Figure 5:
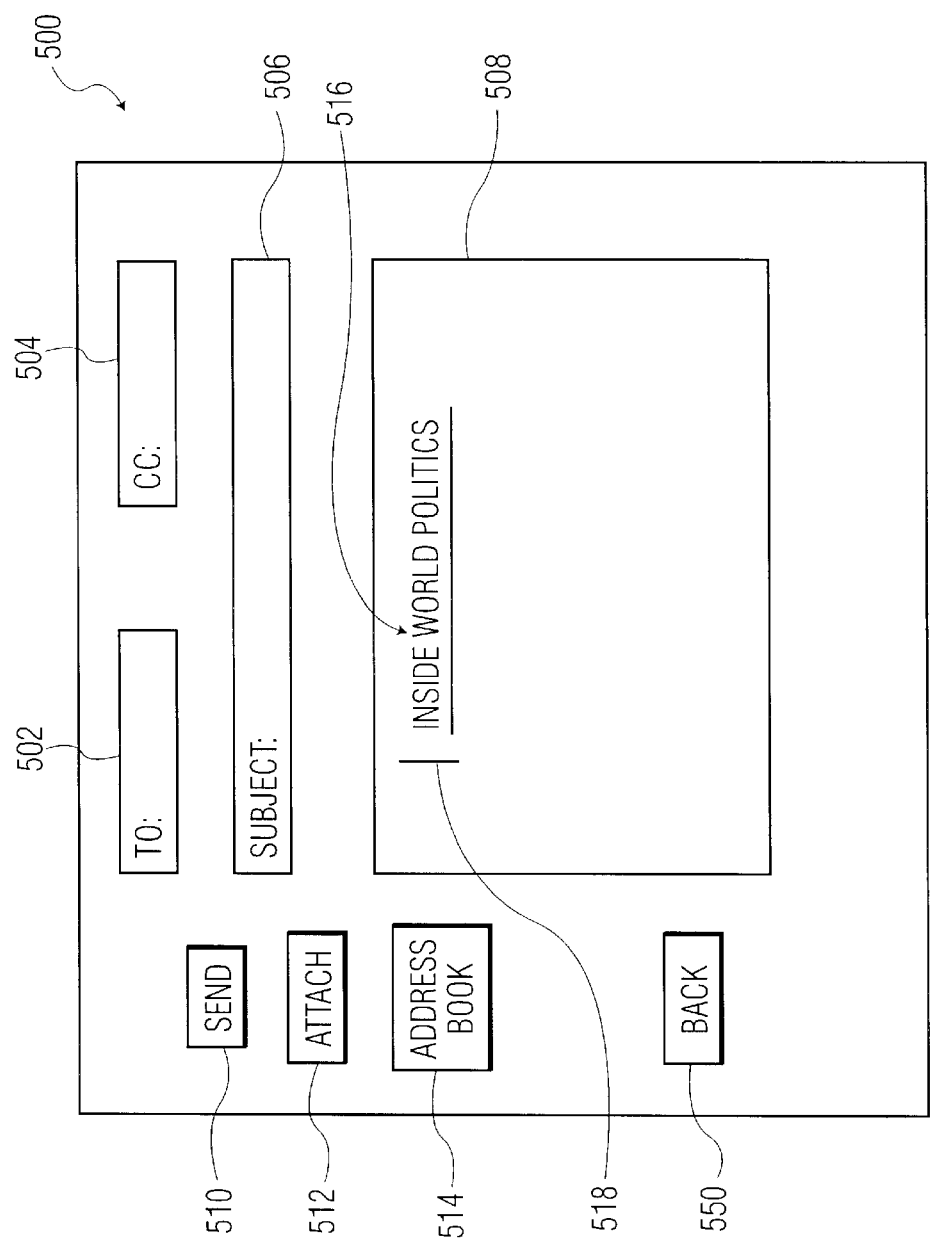
FIG. 5 shows an electronic message display according to a preferred implementation of the present invention.

An exemplary electronic message display 500 is shown in FIG. 5. The exemplary electronic message display 500 includes a RECIPIENT box 502, a CC box 504, a SUBJECT box 506, a message portion 508, a "SEND" icon 510, an "ATTACH" icon 512, and an ADDRESS BOOK icon 514. The message portion 508 preferably is configured by the controller 1110 to include the program text 516 indicative of the program of interest. A cursor 518 also appears in the message portion 508. It is understood, however, that the cursor 518 may be initially generated in another one of the positions on the display screen 500, such as in the RECIPIENT box 502. The present invention is not limited to any particular initial position of the cursor 518.

Using the exemplary electronic message display 500, a user is able to send (Step S4) an electronic message containing program information via the electronic host device and the Internet to one or more recipients (e.g., by inserting the intended recipient's electronic message address in the RECIPIENT box 502 and the electronic message address of any other recipients in the CC box 504 and by subsequently selecting the SEND icon 510). Since the program text 516 is already included in the message portion 508, selection of the SEND icon 510 causes the controller 1110 to respond by transmitting the message portion 508, along with the program text 516 and any associated program information, by electronic message to all of the recipient(s) designated by the address(es) in the boxes 502,504.

The associated program information can include, for example, a program start time, a program end time, a program duration; a channel via which the program is transmitted, and characteristic information, and combinations thereof. Examples of the characteristic information include program title, program theme, program category, program keywords, a program description, program type (e.g. audio, video, audiovisual, computer, Internet, and the like), and program repeat frequency (e.g., once per week, daily, etc.). This additional program information preferably is incorporated automatically into the electronic message by the controller 1110. While the additional program information is derived preferably from the StarSight Module 1160, it is understood that the present invention is not limited in this regard. To the contrary, the additional program information can be provided by the EEPROM 1127, by the communication interface unit 1113, or the like.

Prior to transmission of the electronic message, the controller 1110 preferably allows the user to augment the electronic message portion 508 to include message text other than the program text 516. The entry of such message text is performed according to the location of the cursor 518. Movement of the cursor 518 to desired positions where additional message text will be entered, and entry of such message text (e.g., entry of the electronic message addresses, additional message text on either or both sides of the program text 516, and selection of the icons 510–514) can be performed using a keyboard or other input device dedicated to such functions. Alternatively, such movement of the cursor 518 can be performed using hardware (e.g., the remote control 1125) which is used in performing functions of the electronic host device which are unrelated to electronic message (e.g., program implementation, such as displaying programs, recording of programs, and the like). In this regard, the remote control 1125 can be provided with alphanumeric keys or other means by which alphanumeric information can be conveyed to the controller 1110.

Additionally, or as an alternative, the electronic message display 500 can be modified to include a "virtual" keyboard.

Figure 6:
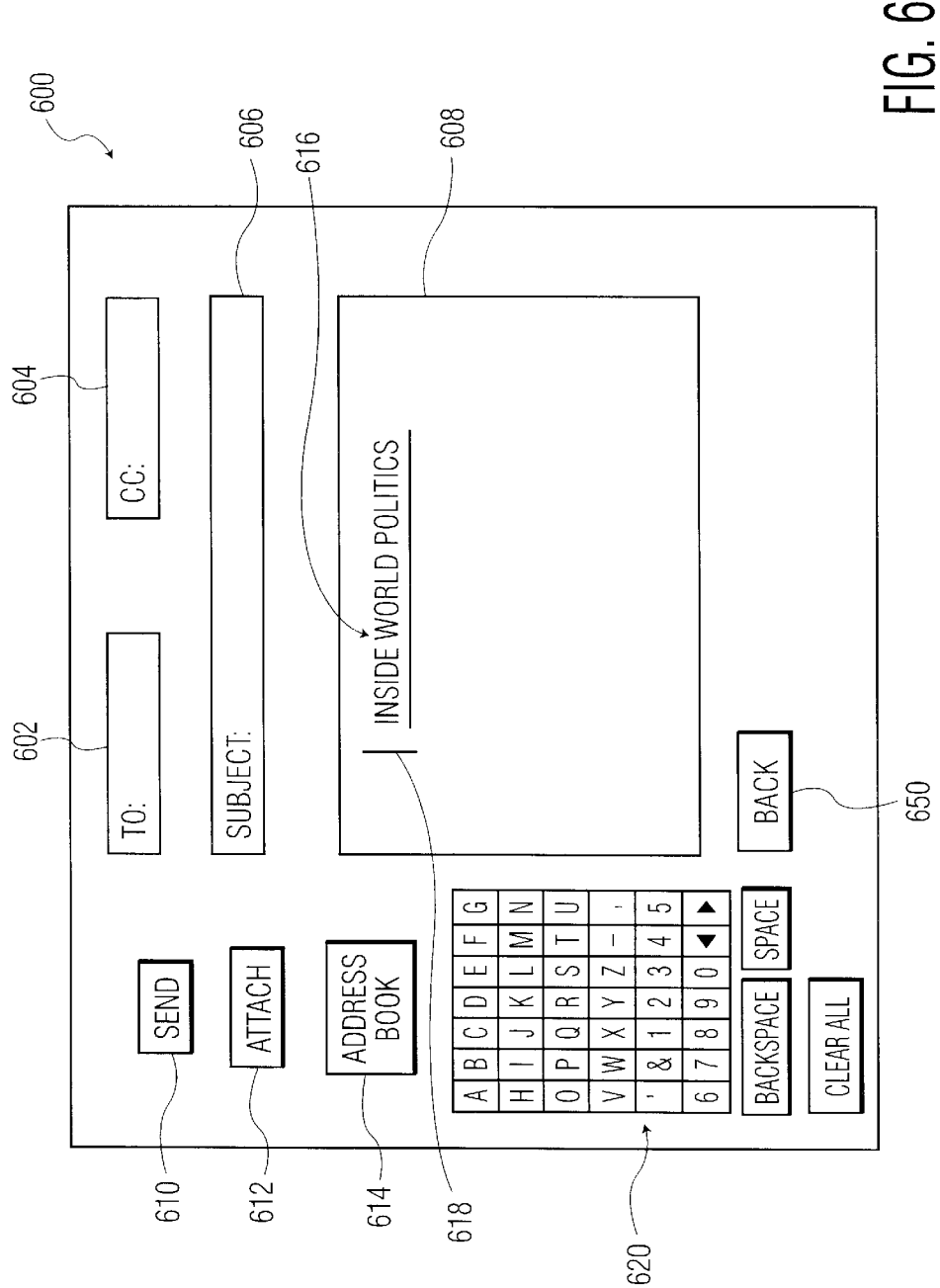
FIG. 6 shows an alternative electronic message display according to a preferred implementation of the present invention.

An exemplary electronic message display 600 having such a virtual keyboard 620 is shown in FIG. 6. The exemplary electronic message display 600 includes the other features 502–518 of the electronic message display 500, except that in electronic message display 600 those features are designated using reference numbers 602–618, respectively. Included in the virtual keyboard 620 is a representation of every Arabic digit and every letter in the alphabet, each of which can be selected using the remote control 1125, a mouse, cursor movement, and/or the like. BACKSPACE, SPACE, and CLEARALL icons preferably are included in the virtual keyboard 620, selection of which effects a corresponding function in a manner well understood in the art.

The user can enter additional message text to the right or left of the program text 516,616 by positioning the cursor 518,618 at the location on the display 500,600 where the message text is desired and by successively selecting the letters or numbers from the virtual keyboard 620, from a physical keyboard, and/or from the remote control 1125. Preferably, as the letters or numbers are selected and the selections are communicated to the controller 1110, the controller 1110 responds by causing the selected letter or number to replace the cursor 518,618 on the display 500,600 and also causes the cursor 518,618 to shift one space to the right in the display 500 or 600. When an entire text line in the message portion 508,608 becomes filled, the controller 1110 preferably causes the text to continue on the next line. Similarly, existing text to the right of the cursor 518 preferably is shifted to the right by the controller 1110 to accommodate the shifted position of the cursor 518,618.

Typically, it is more convenient or practical to provide the virtual keyboard 620 during generation of electronic messages than it would be to provide an alphabetic keypad and/or alphabetic version of remote control 1125. However, in those situations where such a keypad or version of the remote control 1125 is not less convenient nor impractical, it is understood that the controller 1110 can be programmed to permit entry of the recipient addresses, additional message text, and the like using such a keypad or version of the remote control 1125.

Preferably, the controller 1110 responds to entry of the message text by displaying such text in a color, a style, or other manner which clearly distinguishes such text from the program text 516,616. In FIGS. 5 and 6, the program text 516,616 is underlined to distinguish it from the message text.

The controller 1110 preferably is programmed to permit editing of the program text 516,616 from the default form (e.g., the program's title) of the program text 516,616. The editing preferably is facilitated in the same way as insertion of the message text. That is, the cursor 518,618 is positioned on the portion of the program text 516,616 to be edited, and the appropriate modifications are made.

When entry of the message text, addresses, any attachments, and the like has been completed, the user merely selects the SEND icon to effect transmission of the resulting electronic message. The controller 1110 responds to selection of the SEND icon by sending the message portion 508,608 by electronic message to the recipient(s), with the program text 516,616 incorporated into the message portion 508,608. Preferably, the controller 1110 performs this transmission so that the recipient of the electronic message is able to display the message portion 508,608 and its program text 516,616 in such a way that the program text 516,616 is readily distinguishable (e.g. underlined, in a different color, or the like) from any message text. This, in turn, visually informs the recipient that the program text 516,616 is different from the message text, and that it carries additional information and/or capabilities, as will be described hereinafter.

The controller 1110, in the exemplary embodiment of FIG. 1, sends the electronic message via communication interface 1113 and the Internet. Transmitted along with the program text 516,616 is program information associated with the program represented by the program text 516,616. Preferably, this program information includes enough information about the program of interest that a recipient is able to implement the program based on such information.

The program information preferably is transmitted to the recipient in a transparent manner. That is, the recipient's electronic message receiver is adapted to receive the electronic message and to display the message portion 508,608 (including the program text 516,616) without displaying aspects of the program information that do not appear in the program text 516,616. These aspects instead of being visually displayed are transmitted by the controller 1110 in a machine-readable form, such as HTML or the like, to enable a program-implementing device associated with the recipient's electronic message receiver to implement the program of interest based on such aspects of the program information, without having to display them. Preferably, the recipient's electronic message receiver automatically stores the program information, creates an electronic link to the program information from the program text, and/or implements the program of interest.

More specifically, the recipient's electronic message receiver and/or program-implementing device (e.g., a device of the type shown in FIGS. 1 and 2) prompts or otherwise allows the user to select the program text 516,616 from the message portion 508,608. In response to such a selection, a controller of the recipient's receiver and/or device (e.g., controller 1110) causes the program of interest to be implemented. Preferably, this is performed by the controller (e.g., controller 1110) automatically based on the program information when the program text 516,616 is selected from the received electronic message.

Examples of implementation in the context of television and radio programs include automatic tuning to that program if it is currently being air, automatic tuning to the program in the future if it has yet to be aired and is scheduled for broadcast at a later time (e.g., by setting an appropriate timer or the like), automatic recording of the program, and the like. In the context of web-sites, examples of automatic implementation include establishing a communication link to that particular web-site or to a particular "page" of the web-site. Similarly, in the context of extended program guide information (e.g., where the extended guide information provides news, sports, traffic, and/or weather information), examples of automatic program implementation include downloading or tuning to information in certain channels and/or segments of the extended program guide information. Likewise, examples of automatic implementation, in the context of computer programs, include downloading and/or execution of such computer programs.

Alternatively, in response to selection of the program text 516,616, the controller of the recipient's receiver and/or device (e.g., controller 1110) causes user-selectable choices to be displayed to the user, each choice corresponding to a particular option on how the program of interest will be implemented. Preferably, this is performed by the controller (e.g., controller 1110) automatically based on the program information when the program text 516,616 is selected from the received electronic message. As one additional user-selectable option, the display of choices may include a choice to display the transparently transmitted aspects of the program information in a humanly readable manner, as opposed to a machine-readable manner.

Because there may be situations where the program information is to be transmitted to recipients who do not have an electronic program guide or who do not have a device in accordance with the present invention (e.g., a device as shown in FIG. 1 or 2), the controller 1110 preferably imbeds the program information in the electronic message in such a way that recipient devices which are not equipped to transparently process the program information instead display the program information along with the program text 516,616. Such display of the program information can be performed, for example, in parenthesis adjacent to the program text. While such a process of displaying the program information is preferred for those situations where the recipient's equipment cannot process the program information, it is understood that there may be other situations where such displaying of the otherwise transparent aspects of the program information is desirable. The controller 1110 thus can be programmed, according to an alternative arrangement, to visibly insert the program information in all cases where program text 516,616 is being transmitted. This would permit reading of the program information by all of the recipients.

According to a preferred implementation of the present invention, both the sender and recipient are subscribers to an electronic program guide (EPG) having extended guide information capabilities. Examples include those which provide information regarding news, sports, weather, and/or traffic. The sender's controller (e.g., controller 1110) therefore is programmed to permit user selection of a program or programs of interest in the extended guide information, and transmission of electronic message containing program information and program text 516,616 indicative of the extended guide information program or selected parts thereof. The program text 516,616 may comprise, for example, the title of the extended guide information program. The recipient's controller (e.g., controller 1110) likewise is programmed to treat the transmitted program information and program text 516,616 in the manner indicated above for other types of programs. That is, the recipient's controller can implement or otherwise cause the extended program guide information to be implemented for the recipient in response to his/her commands.

As shown in FIGS. 5 and 6, the electronic message displays 500,600 preferably include BACK icons 550,650, each of which is selectable to cause a return of the menu 400. When BACK icon 550,650 is selected, the controller 1110 responds by again displaying the menu 400 and then responds to selection(s) of any additional program identifiers (e.g., channel numbers 410–416, channel station names 420–426, web-site identifier 470, Internet identifier 450, electronic message identifier 460, and the like) by reinstating the electronic message display 500,600 with both the program text 516,616 which appeared in the first occurrence of electronic message display 500,600 and an additional item of program text corresponding to the program which was selected during the return to the menu 400. Both items of program text are associated with their respective items of program information as described above. The resulting arrangement advantageously permits the transmission of multiple items of programming information in one electronic message.

Advantageously, the foregoing exemplary implementations of the method shown in FIG. 3 and the systems associated therewith provide a convenient and versatile interface capable of incorporating program information into an electronic message. The interface, for example, includes an electronically generated menu of programs (e.g., the menu 400 shown in FIG. 4). The electronically generated menu includes program identifiers (e.g., channel numbers 410–416, channel station names 420–426, web-site identifier 470, Internet identifier 450, electronic message identifier 460, and the like) indicative of the various programs. A program selector adapted to select from the menu at least one of the program identifiers which is indicative of a program of interest, also is provided. Examples of such a selector include remote control 1125, the virtual keyboard 620, a mouse, and/or any cursor display and movement device capable of communicating a user's selection from the menu to the controller 1110.

In addition, as indicated above, an electronic message display (e.g., displays 500 and 600 in FIGS. 5 and 6) is electronically generated on the display device by the controller 1110. In as much as the exemplary electronic message displays 500,600 include the program text 516,616, those displays 500,600 are based, at least partially, on the user's selection of at least one of the program identifiers. The program text 516,616 included in the displays 500,600 is indicative of the program of interest and is included in the message portion 508,608 of each electronic message display 500,600.

The controller 1110, by virtue of its connection to the communication interface unit 1113, is adapted to send the message portion 508,608 by electronic message to a recipient. Within the message portion 508,608 of the electronic message transmission is the program text 516,616. Since the controller 1110 is programmed, as indicated above, to permit entry of message text into the message portion 508,608, the inventive interface also facilitates transmission of a message portion 508,608 which includes both message text and program text 516,616. Similarly, since the controller 1110 is programmed to send the program information associated with the program of interest in the electronic message transmission, the exemplary interface of the present invention provides a way of sending such program information via electronic message.

The controller 1110, as indicated above, is able to send the program information in a format which causes the program information to be visibly inserted into the message portion 508,608. The program information therefore can be read by the recipient. The interface of the present invention thus provides a convenient way of sending such program information to a recipient, without the sender having to manually type all of the program information into the electronic message.

Alternatively, however, the interface of the present invention may be adapted through suitable programming or otherwise, to send the program information in a format which causes the message portion 508,608 to be displayed to the recipient with the message text and the program text 516,616 being visible, and without visually displaying certain aspects of the program information. Those aspects of the program information which are not displayed are transmitted by the interface of the present invention in a machine-readable format to enable a program-implementing device associated with the electronic message receiver to implement the program of interest based on those aspects of the program information.

As demonstrated above, the interface of the present invention is particularly well-suited for use in connection with an electronic program guide (EPG) which, in turn, is distributed using a distribution protocol. The electronic program guide (EPG) in this regard may constitute all or a portion of the menu 400. Similarly, the interface achieved by the present invention is particularly wellsuited, as indicated above, for use in transmitting program information associated with extended program guide information (e.g., information regarding news, sports, weather, traffic, and the like).

When the interface of the present invention is combined with an electronic message receiver, a system for communicating program information via electronic message is provided. The electronic message receiver is adapted to receive and display incoming electronic message or to cause such incoming electronic message to be displayed on an associated display device. While conventional electronic message receiving devices can be used to receive the electronic message transmissions and their associated program text, message text, and the program information, those conventional devices typically are only configured to visibly display the program information. Conventional devices generally are not configured to receive the program information without displaying it, nor are they configured to automatically implement the programs represented by the program text 516,616.

A more preferred embodiment of the present invention therefore includes another electronic host device which operates as the electronic message receiver. The recipient electronic host device is identical to or similar to the device which sends the electronic message (e.g., one of the exemplary embodiments shown in FIGS. 1 and 2), and its controller 1110 is programmed, as indicated above, to not only send the electronic messages but also to receive, process and display electronic messages. The recipient host device thus has a controller 1110 which is programmed to distinguish between the aspects of the program information which are not to be displayed and those which constitute the program text 516,616.

Once the distinction is recognized by the controller 1110, the message text and program text 516,616 are displayed together, and the undisplayed program information is stored in a memory device of the controller 1110. An exemplary display 700 generated by an electronic message receiver according to the present invention is shown in FIG. 7.

Figure 7:
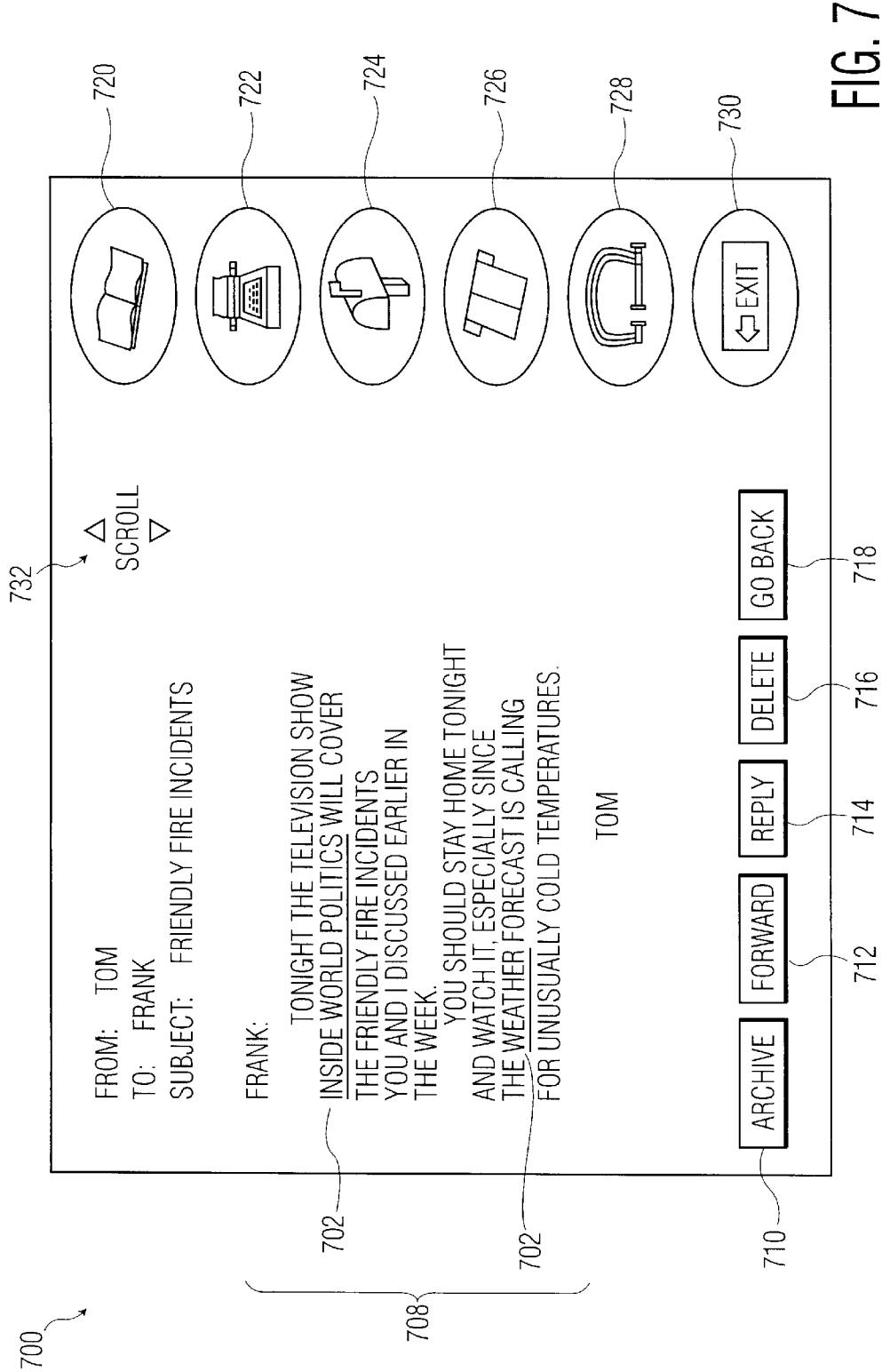
FIG. 7 shows an exemplary electronic message display provided to a recipient according to a preferred implementation of the present invention.

In FIG. 7, the recipient's electronic message display 700 includes two occurrences of program text 702 and some additional message text (the non-underlined text). The message text was incorporated into the message portion 708 using one of the electronic message displays 500,600, as described above. The recipient is able to visually distinguish the program text 702 from the message text because only the program text 702 is underlined. The recipient's electronic message display 700 also includes user-selectable icons 710–732 which represent various electronic message functions which can be carried out in a manner well known in the art. Examples of such functions include archiving electronic message, forwarding electronic message, replying to electronic messages, deleting electronic messages, going back to a previous "Window", scrolling through an electronic message, reading electronic message, composing electronic message, reviewing messages in a mailbox, filing or storing of electronic messages, attaching files, and exiting. Preferably, the controller 1110 is programmed to execute respective ones of the functions in response to selection of a corresponding one of the icons 710–732.

Preferably, as indicated above, the embodiment shown in FIG. 1 provides a combined electronic message receiver and television device. The combined device has a selector (e.g., remote control 1125, keypad, mouse, keyboard, or cursor) which is actuatable by the recipient to communicate to the combined host device the recipient's selection of a title (or other program text 702) from the message portion 708. The controller 1110 of the host device preferably is programmed to respond to such a selection by displaying the television program if the selected program is a television program which is currently being broadcast, or by setting a timer for subsequent display of the television program if the selected program is a television program which is scheduled for broadcast at a later time.

Preferably, the television-encompassing version of the host device shown in FIG. 1 is associated with a recording device (not shown), and the selector is actuatable to effect recording of the television program when the electronic message recipient selects the program text 702 (e.g., the text reciting "Insider World Politics") and elects to record the television program.

As indicated above, the host device is configured to implement an electronic program guide (EPG) having extended guide information capabilities. The electronic program guide is distributed using an EPG distribution protocol and preferably includes extended guide information. Since the program of interest may be a program contained in the extended guide information (e.g., information on sports, weather, news, traffic, and the like), the controller 1110 is programmed to be responsive to selection of program text 702 associated therewith. In FIG. 7, for example, the program text 702 for "weather" is selectable by the electronic message recipient to access extended guide information relating to weather. In particular, access to the weather-related information is gained using the program information which accompanied the program text 702 in the electronic message.

The controller 1110 can be suitably programmed to perform automatic implementation of a program based on the program information when the program text 702 associated with that program is selected. In particular, the controller 1110 responds to such selection by tuning to the appropriate channel, communicating with the appropriate remote computer server, or connecting to a related web-site.

Alternatively, the controller 1110 can be suitably programmed to respond to selection of an item of program text 702 by performing interactive implementation. Under an interactive implementation scheme, the recipient is presented with several choices on how and whether to implement the selected program. The choices are presented on the recipient's display device.

If the program information associated with the selected program text 702 indicates, for example, that the selected program is a television program, the controller 1110 responds by displaying the choices of: tuning to the television program (e.g., using tuner 1105), recording of the television program, viewing of more complete information about the selected program (e.g., viewing the program information which otherwise is processed transparently for the recipient), forwarding the program text 702 and the program information to another person by electronic message, or disregarding the sender's reference to the selected program (e.g., exiting back to the electronic message). Preferably, the device shown in FIG. 1 is connected to or includes a recorder device (e.g., a video tape recorder) adapted to record programs received by the device shown in FIG. 1.

Using the selector (e.g., keyboard, mouse, virtual keyboard, and/or cursor), the recipient selects one of the displayed choices, and the controller 1110 responds by implementing the selected program in the selected manner. Preferably, the controller is programmed to respond to selection of the "viewing" option by displaying the more complete information (i.e., including information not already present in the program text 702). and by presenting the recipient with all of the foregoing exemplary choices except the "viewing" choice. This way, the recipient can choose the manner of implementation after viewing the more complete information.

The same, different, or similar choices are generated for the other types of programs. For computer programs, for example, the choices may include downloading of the program, execution of the program, or viewing more details about the program.

Alternatively, the controller 1110 may provide a hybrid implementation scheme whereby automatic implementation is provided for some types of programs, where such automatic implementation is more practical or desirable, and interactive implementation for the other types of programs.

While the present invention finds much usefulness in the realm of electronic host devices which are connected to or defined by a television set, the present invention is not limited to such electronic host devices. The present invention may be implemented, for example, with a computer as the electronic host device, and the program information associated with the program text 516, 616, 702 may include an electronic shortcut to a corresponding computer program.

Since EPG displays can include program advertisements (e.g., advertising television programs, web-sites, computer programs which can be downloaded, and the like), the controller 1110 preferably is also programmed so that selection of the advertisement (e.g., using one of the aforementioned selection devices) either implements the program being advertised, or provides userselectable choices on how and whether to implement the subject program. Included in such choices is the choice to send program information associated with the advertisement or associated with the advertised program to another person by electronic message.

The method described above and the systems through which it can be implemented (e.g., the systems shown in FIGS. 1 and 2) thus provide an electronically generated interface for displaying a program guide and for sending electronic messages incorporating information from such program guides, without having to manually type in the program guide information. The interface provided by the exemplary programs and systems also facilitates linking of program guide information in an electronic message to program guide information of a recipient, and implementation of programs associated therewith.

While each host device (e.g., the devices illustrated in FIGS. 1 and 2) preferably is programmed or otherwise adapted to provide all of the foregoing features, it is understood that the invention is not limited in this regard. That is, host device may achieve only one or some of the features described above, such host devices nevertheless falling well within the spirit and scope of the present invention.

In describing the preferred embodiments, some components were described as being hardware components and others were described as software components. Such components, however, can be implemented using hardware, software, or combinations thereof.

It is to be understood that the embodiments and variations shown and described herein are for illustrations only and that various modifications may be implemented by those skilled in the art without departing from the scope and spirit of the invention.

What is claimed is:

1. A method of incorporating program information into an electronic message, said method comprising the steps of:
- generating a menu of programs by displaying program identifiers on a display device;
- selecting at least one of the displayed program identifiers which is associated with a program of interest;
- generating an electronic message display with program text associated with the program of interest automatically incorporated into a message portion of the electronic message display in response to a command to add data associated with the selected program identifier in said electronic message display; and
- sending the message portion by electronic message to a recipient, with the program text incorporated into the message portion.

2. The method of claim 1, further comprising the step of inserting message text into the message portion so that said message portion includes said message text and said program text.

3. The method of claim 1, wherein said step of sending the message portion by electronic message includes the step of sending program information associated with said program of interest to said recipient.

4. The method of claim 3, wherein said program information is visibly inserted into said message portion to permit reading of said program information by the recipient.

5. The method of claim 3, further comprising the step of displaying said message portion to the recipient with said message text and said program text being visible, and without visually displaying aspects of said program information, said aspects of the program information being machine-readable to enable a program-implementing device associated with said recipient to implement said program of interest based on said aspects of the program information.

6. The method of claim 5, further comprising the step of selecting said program text from the message portion at said program-implementing device to effect implementation of the program of interest.

7. The method of claim 6, wherein said program-implementing device implements said program of interest automatically based on said program information when said program text is selected.

8. The method of claim 3, wherein said menu is an electronic program guide (EPG) which is distributed using an EPG distribution protocol;
- wherein said program of interest is a television program which is listed in said electronic program guide;
- wherein said program text comprises a title associated with said television program; and
- wherein said program information includes information selected from the group consisting of: a program start time, a program end time, a program duration; a channel via which said television program is transmitted, and combinations thereof.

9. The method of claim 8, further comprising the step of selecting said title from the message portion at a television device associated with the recipient, said television device being programmed to respond to such selection by displaying the television program if the television program is being broadcast, by setting a timer for subsequent display of the television program if the television program is scheduled for broadcast at a later time, and by recording the television program if the recipient elects to record said television program during said step of selecting.

10. The method of claim 3, wherein said menu is an electronic program guide (EPG) which is distributed using an EPG distribution protocol, said electronic program guide including extended guide information;
- wherein said program of interest is a program contained in said extended guide information;
- wherein said program text comprises a title associated with said program of interest; and
- wherein said program information includes information selected from the group consisting of: a program start time, a program end time, a program duration; a channel via which said extended guide information program is transmitted, and combinations thereof.

11. An interface for incorporating program information into an electronic message, said interface comprising:
- an electronically generated menu of programs, said electronically generated menu including program identifiers indicative of said programs;
- a program selector adapted to select from said menu at least one of the program identifiers which is indicative of a program of interest;
- an electronic message display which is electronically generated and which is based at least in part on selection of said at least one program identifier, said electronic message display automatically including program text indicative of the program of interest in response to a command to add data associated with the selected program identifier in said electronic message display, said program text being included in a message portion of the electronic message display; and
- an electronic device adapted to send said message portion by electronic message to a recipient, with the program text incorporated into the message portion.

12. The interface of claim 11, wherein said electronic device includes means for inserting message text into said message portion so that said message portion includes said message text and said program text.

13. The interface of claim 11, wherein said electronic device is adapted to send program information associated with said program of interest to said recipient.

14. The interface of claim 13, wherein said electronic device is adapted to send said program information in a format which causes said program information to be visibly inserted into said message portion to permit reading of said program information by the recipient.

15. The interface of claim 13, wherein said electronic device is adapted to send said program information in a format which causes said message portion to be displayed to the recipient with said message text and said program text being visible, and without visually displaying aspects of said program information, said aspects of the program information being machine-readable to enable a program-implementing device associated with said recipient to implement said program of interest based on said aspects of the program information.

16. The interface of claim 13, wherein said menu is an electronic program guide (EPG) which is distributed using an EPG distribution protocol;
- wherein said program of interest is a television program which is listed in said electronic program guide;
- wherein said program text comprises a title associated with said television program; and
- wherein said program information includes information selected from the group consisting of: a program start time, a program end time, a program duration; a channel via which said television program is transmitted, and combinations thereof.

17. A system for communicating program information via electronic message, said system comprising:
- an electronic message receiver adapted to receive and display incoming electronic message; and
- an interface capable of incorporating program information into an electronic message and transmitting said program information electronically to said electronic message receiver, said interface comprising:
  - an electronically generated menu of programs, said electronically generated menu including program identifiers indicative of said programs;
  - a program selector adapted to select from said menu at least one of the program identifiers which is indicative of a program of interest;
  - an electronic message display which is electronically generated and which is based at least in part on selection of said at least one program identifier, said electronic message display automatically including program text indicative of the program of interest in response to a command to add data associated with the selected program identifier in said electronic message display, said program text being included in a message portion of the electronic message display; and
  - an electronic device adapted to send said message portion by electronic message to a recipient at said electronic message receiver, with the program text incorporated into the message portion.

18. The system of claim 17, wherein said electronic device includes means for inserting message text into said message portion so that said message portion includes said message text and said program text.

19. The system of claim 17, wherein said electronic device is adapted to send program information associated with said program of interest to said electronic message receiver.

20. The system of claim 19, wherein said electronic device is adapted to send said program information to said electronic message receiver in a format which causes said program information to be visibly inserted into said message portion to permit reading of said program information by the recipient.

21. The system of claim 19, wherein said electronic device is adapted to send said program information to said electronic message receiver in a format which causes said message portion to be displayed to the recipient at said electronic message receiver with said message text and said program text being visible, and without visually displaying aspects of said program information, said aspects of the program information being machine-readable to enable a program-implementing device associated with said recipient to implement said program of interest based on said aspects of the program information, said program-implementing device being incorporated in or connected to said electronic message receiver.

22. The system of claim 19, wherein said menu is an electronic program guide (EPG) which is distributed using an EPG distribution protocol;
- wherein said program of interest is a television program which is listed in said electronic program guide;
- wherein said program text comprises a title associated with said television program; and
- wherein said program information includes information selected from the group consisting of: a program start time, a program end time, a program duration; a channel via which said television program is transmitted, and combinations thereof.

23. The system of claim 22, wherein said electronic message receiver is a television device having electronic message capabilities, said television device having a selector which is actuatable by the recipient to communicate to the television device the recipient's selection of said title from the message portion, said television device being programmed to respond to such selection by displaying the television program if the television program is being broadcast, by setting a timer for subsequent display of the television program if the television program is scheduled for broadcast at a later time.

24. The system of claim 23, wherein said television device is associated with a recording device, and wherein said selector is actuatable to effect recording of the television program when the recipient elects to record said television program.

25. The system of claim 17, wherein said menu is an electronic program guide (EPG) which is distributed using an EPG distribution protocol, said electronic program guide including extended guide information;
- wherein said program of interest is a program contained in said extended guide information;
- wherein said program text comprises a title associated with said program of interest; and
- wherein said program information includes information selected from the group consisting of: a program start time, a program end time, a program duration; a channel via which said extended guide information program is transmitted, and combinations thereof.

26. The system of claim 17, wherein said electronic message receiver includes or is connected to a program implementing device adapted to implement said program of interest, said electronic message receiver further comprising a selector adapted to select said program text from the message portion to effect implementation of the program of interest by said program implementing device.

27. The system of claim 26, wherein said program-implementing device is adapted to implement said program of interest automatically based on said program information when said program text is selected by the recipient via said selector.

28. An electronic message receiver comprising:
- means for receiving program information via electronic message and being adapted to receive and display message text and program text, via electronic message, said program text automatically included in said electronic message in response to a command to add data associated with a selected program in said electronic message, and also being adapted to process program information which is transmitted along with said message text and program text; and
- a selector adapted to select said program text in response to user actuation, to effect, based on said program information, implementation of a program represented by said program text.

29. The electronic message receiver of claim 28, wherein said program is a television program;
- wherein said electronic message receiver is incorporated into or connected to a television device;
- wherein said program text comprises a title associated with said television program; and
- wherein said program information includes information selected from the group consisting of: a program start time, a program end time, a program duration; a channel via which said television program is transmitted, and combinations thereof.

30. The electronic message receiver of claim 29, wherein said selector is adapted to display via said television device choices of how to implement said television program in response to selection of said program text.

31. The electronic message receiver of claim 30, wherein said choices are taken from the group consisting of: displaying of said television program, recording of said television program, displaying of program information which does not already appear in said program text, and combinations thereof.

32. The electronic message receiver of claim 29, wherein said television device is associated with a recording device, and wherein said selector is actuatable to effect recording of the television program.

33. The electronic message receiver of claim 28, wherein said electronic message receiver is incorporated into or connected to a television device having extended guide information capabilities, and wherein said program is a program contained in extended guide information.

34. The electronic message receiver of claim 28, wherein said extended guide information is selected from the group consisting of: weather information, news information, sports information, and combinations thereof.

* * * * *